(12) United States Patent
Debrunner et al.

(10) Patent No.: US 12,474,770 B2
(45) Date of Patent: Nov. 18, 2025

(54) EYE TRACKING DEVICE, EYE TRACKING METHOD, AND COMPUTER-READABLE MEDIUM

(71) Applicant: INVATION AG, Zürich (CH)

(72) Inventors: Thomas Debrunner, Zürich (CH); Pierre Giraud, Opfikon (CH); Chenghan Li, Zürich (CH); Kynan Eng, Zürich (CH)

(73) Assignee: INVATION AG, Zürich (CH)

( * ) Notice: Subject to any disclaimer, the term of this patent is extended or adjusted under 35 U.S.C. 154(b) by 337 days.

(21) Appl. No.: 18/004,152

(22) PCT Filed: Jun. 30, 2021

(86) PCT No.: PCT/EP2021/067972
§ 371 (c)(1),
(2) Date: Jan. 3, 2023

(87) PCT Pub. No.: WO2022/003013
PCT Pub. Date: Jan. 6, 2022

(65) Prior Publication Data
US 2023/0266818 A1    Aug. 24, 2023

(30) Foreign Application Priority Data
Jul. 3, 2020 (EP) ...................... 20184020

(51) Int. Cl.
*G06F 3/01* (2006.01)
*G06T 7/70* (2017.01)
*H04N 25/47* (2023.01)

(52) U.S. Cl.
CPC .............. *G06F 3/013* (2013.01); *G06T 7/70* (2017.01); *H04N 25/47* (2023.01); *G06T 2207/20084* (2013.01); *G06T 2207/30201* (2013.01)

(58) Field of Classification Search
None
See application file for complete search history.

(56) References Cited

U.S. PATENT DOCUMENTS 10,466,779 B1    11/2019   Liu
2019/0156210 A1*  5/2019   He ........................ G06N 3/045
(Continued)

FOREIGN PATENT DOCUMENTS

EP      3 598 274 A1       1/2020
WO   WO 2019/147677 A1    8/2019
WO   WO 2020/068140 A1    4/2020

OTHER PUBLICATIONS

S. Tulyakov, F. Fleuret, M. Kiefel, P. Gehler and M. Hirsch, "Learning an Event Sequence Embedding for Dense Event-Based Deep Stereo," 2019 IEEE/CVF International Conference on Computer Vision (ICCV), Seoul, Korea (South), 2019, pp. 1527-1537, doi: 10.1109/ICCV.2019.00161.*

(Continued)

*Primary Examiner* — Jiangeng Sun
(74) *Attorney, Agent, or Firm* — Christensen, Fonder, Dardi & Herbert PLLC; John P. Fonder (57) ABSTRACT

An eye tracking device including an event-based optical sensor, configured to receive radiation reflected off an eye of a user and produce a signal stream of events, each event corresponding to detection of a temporal change in the received radiation at one or more pixels of said optical sensor, and a controller, which is connected to said optical sensor and configured to: a) receive the signal stream of events from the optical sensor, b) generate an inference frame based on the stream of events, c) utilize the inference frame as input to a machine learning module and operate the machine learning module to obtain output data, and e) extract from the output data information related to the eye of (Continued)

the user, wherein the controller is configured to generate the inference frame utilizing a first artificial neural network.

13 Claims, 8 Drawing Sheets

(56) References Cited

U.S. PATENT DOCUMENTS

| | | | |
|---|---|---|---|
| 2020/0104692 A1* | 4/2020 | Hill | G06F 5/06 |
| 2020/0244997 A1* | 7/2020 | Galpin | G06T 9/002 |
| 2020/0293858 A1* | 9/2020 | Das | G06F 17/16 |
| 2023/0266818 A1* | 8/2023 | Debrunner | G06F 3/013 |
| | | | 382/103 |

OTHER PUBLICATIONS

M. Capra, B. Bussolino, A. Marchisio, G. Masera, M. Martina and M. Shafique, "Hardware and Software Optimizations for Accelerating Deep Neural Networks: Survey of Current Trends, Challenges, and the Road Ahead," in IEEE Access, vol. 8, pp. 225134-225180, 2020, doi: 10.1109/ACCESS.2020.3039858.*

I. Brumar, M. Casas, M. Moreto, M. Valero and G. S. Sohi, "ATM: Approximate Task Memoization in the Runtime System," 2017 IEEE International Parallel and Distributed Processing Symposium (IPDPS), Orlando, FL, USA, 2017, pp. 1140-1150, doi: 10.1109/IPDPS.2017.49.*

Z. Du, S. Wu, D. Huang, W. Li and Y. Wang, "Spatio-Temporal Encoder-Decoder Fully Convolutional Network for Video-Based Dimensional Emotion Recognition," in IEEE Transactions on Affective Computing, vol. 12, No. 3, pp. 565-578, Jul. 1-Sep. 2021, doi: 10.1109/TAFFC.2019.2940224.*

Silfa, Franyell, et al., "Neuron-Level Fuzzy Memoization in RNNs," *Micro '52: Proceedings of the 52$^{nd}$ Annual IEEE/ACM International Symposium on Microarchitecture*, 12 pages (Oct. 12-16, 2019).

Anelopoulos, Anastasios N., et al., "Event Based, Near-Eye Gaze Tracking Beyond 10,000Hz," arxi.org, Cornell University Library, 22 pgs. (Apr. 7, 2020).

Rupanagudi, Sudhir Rao, et al., "A Video Processing Based Eye Gaze Recognition Algorithm for Wheelchair Control," *2019 10$^{th}$ International Conference on Dependable Systems, Services and Technologies (Dessert)*, IEEE, pp. 241-247 (Jun. 5, 2019).

* cited by examiner

EYE TRACKING DEVICE, EYE TRACKING METHOD, AND COMPUTER-READABLE MEDIUM

RELATED APPLICATIONS

The present application is a National Phase entry of PCT Application No. PCT/EP2021/067972, filed Jun. 30, 2021, which claims priority to European Patent Application No. 20184020.4, filed Jul. 3, 2020, the disclosures of which are hereby incorporated by reference herein in their entirety.

FIELD OF THE INVENTION

The invention relates to an eye tracking device, an eye tracking method, and a computer-readable medium.

BACKGROUND OF THE INVENTION

Eye tracking generally refers to the monitoring of the movement of the eye or the gaze of a human being, called a user. However, the user may of course also be any other living creature having an eye that can change its viewing direction in its socket.

One possible way of tracking a user's gaze is by way of a conventional video or photo camera that obtains full frames of images, or conventional frames, of the eye at intervals. A controller connected to the camera then analyzes each of these image frames to determine the position of the pupil at the time the frame was captured, thus allowing it to deduce the direction the user is looking. This method necessitates the use of a frame-based camera, such as a video or photo camera, which obtains images of the eye for the controller to analyze. Such conventional or frame-based cameras are often slow. They also produce a large volume of data that needs to be transferred between the camera and the controller.

The eye tracking process can be accelerated by utilizing an event-based camera or event-based sensor, also called a dynamic vision sensor (DVS). EP 3598274 A1 describes a system comprising multiple cameras, where one of the cameras is an event-based camera or DVS. However, this known system is also dependent on a second, frame-based camera. Similarly, the publication "Event Based, Near Eye Gaze Tracking Beyond 10,000 Hz." by Angelopoulos, Anastasios N., et al., preprint arXiv: 2004.03577 (2020), uses ellipse detection on conventional image frames in conjunction with event-based DVS data for the task of eye tracking. A conventional computer vision approach is used, although the authors mention that a deep-learning-based extraction method would be an easy extension to their work. Therefore, also here the eye tracking process relies at least in part on conventional image frames obtained by a frame-based camera. The reliance on the availability of image frames of the eye requires an eye tracking system to obtain a full frame before being able to accurately predict the position of the eye. While some systems can utilize interpolation to predict future states, the worst-case latency is defined by the time it takes to obtain a full frame.

A different approach is followed by U.S. Pat. No. 10,466,779 A1, which describes an eye tracking system that uses DVS data and outlines a method to convert the received DVS data into an intensity image, similar to a conventional frame. The algorithm uses a mathematical property of the DVS stream. A conventional computer vision approach is used to predict gaze and pupil characteristics from the so obtained intensity image.

A method which combines the acquisition of a purely event-based sensor output with a machine learning approach using convolutional neural networks for eye tracking is described in WO 2019147677 A1. Therein is described a system that accumulates events from an event camera to produce either intensity images, frequency images or time-stamp images, which are subsequently fed into a neural network algorithm to predict various gaze parameters. The described system uses a hand-crafted, static accumulation regime, a common and well-known technique to create an approximation of an intensity image from event data. The downside of this approach is that images tend to be noisy and exhibit artefacts from past pupil positions. Down-stream frame-based convolutional neural networks, such as described in WO 2019147677 A1, can struggle with noisy data and temporal artefacts such as the ones unavoidable when accumulating DVS events, thus requiring more complex neural networks.

SUMMARY

It is an objective of the present invention to suggest a device and a method for more reliably tracking the movement of a user's eye.

This objective is met according to the present invention by providing an eye tracking device, eye tracking method and computer-readable medium with the features of the claims. Further advantageous embodiments of the invention are subject of the sub-claims.

According to the invention, the eye tracking device comprises an event-based optical sensor and a controller connected to the sensor. Radiation reflected off an eye of a user is received by the event-based optical sensor, which is configured to produce a signal stream of events in response to the radiation. This signal stream is sent to the controller, which performs various processes on the signal stream in order to obtain the result of the eye tracking process. The controller may therefore comprise at least a processing unit and a memory for performing the analysis described in the following. In the following, the event-based optical sensor will just be called the event sensor.

The sensor, in particular a dynamic vision sensor, comprises a number of individual pixels arranged in an array, each pixel having a photosensitive cell or a photosensitive area. Upon detection of a temporal change in the incident light impinging on that photosensitive cell, an event signal, herein just called "an event", is generated. Each event in the signal stream of events produced by the sensor thus corresponds to the detection of a temporal change in the received radiation at one or more pixels of said optical sensor. Each event may in particular comprise the position of the corresponding pixel in the array, an indicator showing the polarity and optionally also the magnitude of the temporal change, and the time the change occurred. The events are sent as part of the signal stream to the controller for further processing.

The controller is configured to receive the signal stream of events, generate by way of a first artificial neural network an inference frame to be utilized as input to a machine learning module, operate the machine learning module to obtain output data, and to extract from the output data the sought after information relating to the eye of said user. Advantageously, the output data generated by the machine learning module is the sought after information, such as pupil position/orientation etc.

The inference frame may be defined by that it is a frame that is an output of the first artificial neural network and the input to the machine learning module. The term inference frame may refer to a 3D tensor of dimensions width, height, channels. The channels are a collection of different representations of the data. The different representations can in particular include intensity in linear or non-linear, such as log, scale, spatial or temporal derivatives, intensity and/or phase of frequency components.

The first neural network is trained with corresponding input and output data. The input and output data may be generated using simulation software. For the training data, the components of the inference frames, which are the network's output, are created using standard image processing techniques, while the event input streams are computed using a mathematical model of the event sensor. Selection of the representations is advantageously done in such a way as to optimize the performance of the second neural network. The first neural network is preferably trained such as to create best possible approximations of these representations.

By having the first neural network create all representations directly, the system may achieve a better reconstruction performance as opposed to using standard image processing approaches on a single learned representation. By having multiple representations as input to the second neural network, the second neural network may achieve better performance in estimating eye gaze parameters than by only having a single representation.

The invention is based on the concept of generating the inference frame by way of the first artificial neural network, before handing the generated inference frame to the machine learning module. Therefore, while it is known from the prior art to use a hand-crafted, static accumulation regime, a common and well-known technique, to create an inference frame from event data to input into a machine learning module, the present invention proposes a system that does not utilize a hand-crafted accumulation scheme, but leaves the generation of the inference frame to a neural network. Using this approach, much better quality inference frames can be achieved, which lead to better estimation by the subsequent machine learning module or process. In addition, in accordance with the present invention, the pupil position is determined based solely on the signal stream of events, without having to access image frames collected by a conventional frame-based camera.

For the machine learning module to be able to process the input data, the latter has to be provided in an appropriate form. The first artificial neural network is there to transform the stream of events into an inference frame, which can then be handled by the machine learning module. Preferably, the inference frame has the same number of pixels as the event sensor. However, the inference frame must be distinguished from a conventional image frame of the eye that can be provided by a conventional camera. While the inference frame comprises a plurality of frame pixels arranged in an array, and while it could be an approximation of an image of the eye, depending on the parameters and response of the first artificial neural network that is used, it is not necessarily intended as such an approximation. In particular, it is not necessary for the first artificial neural network to be configured such that the output it provides is an approximation of the eye that is monitored. Rather, advantageously, the first artificial neural network is configured to create an inference frame of the form that enhances or maximizes the performance of the subsequent machine learning module. A suitable inference frame may be any kind of frame that contains the necessary information for the machine learning module to process. These may include for example an approximate intensity of linear or non-linear scale, a first order spatial derivative of the said approximate intensity, and/or a higher order spatial derivative of the said approximate intensity.

According to an advantageous embodiment, the controller is configured to convert the portion of the stream of events into a sparse tensor, and use the sparse tensor as an input for the first artificial neural network. The tensor may in particular have the dimensions of the event sensor, i.e. W×H×1, where W and H are the width and the height of the sensor in pixels. The tensor contains all zeros, except for the coordinates x, y for which the sensor reported an event at the corresponding pixel. If the event was positive, the tensor contains a 1 at coordinates x, y, while it contains a −1 for a negative event. Here, positive and negative indicate the polarity of the change of light intensity that is recorded as an event. In the case that the event sensor is configured to not only notify on the polarity, but also the magnitude of the light intensity change of a pixel, the value of the tensor at the coordinates x, y of the pixel is this signed magnitude value. Should multiple events happen at the same pixel in the batch of events corresponding to the same tensor, only the first one is considered. On the other hand, multiple events at differing pixels will be included in the tensor separately.

The controller may split the stream of events into portions of one, two or more events, in particular consecutive events. Each such portion may contain a predetermined number of events. Alternatively, the portion may be representing a predetermined time interval and contain all the events occurring within that time interval, time slot or time duration. In the implementation with the sparse tensor, said controller would be configured to generate the sparse tensor based on a predetermined number of events or based on events occurring within a predetermined time interval or within a predetermined time duration.

Advantageously, the first artificial neural network is a recurrent neural network, i.e. an RNN. An RNN means in particular that the last output from the RNN is fed back to or fed into the RNN in some way, e.g. at the last layer, at the first layer and/or at some layer in-between. Advantageously, the output of the RNN is fed back to the input of the RNN. In particular, the output of the RNN after one execution of the RNN algorithm may be utilized as one of multiple inputs to the RNN during a consecutive execution of the RNN algorithm, e.g. together with another tensor to be processed.

The first artificial neural network comprises multiple layers, one, two or more of which may be convolutional layers. In case the first artificial neural network is an RNN, it may thus also be called a convolutional recurrent neural network. The first artificial neural network may also comprise a concatenation layer, in particular as a first layer, in order to join, or concatenate, the output after an execution and the new input for a consecutive execution of the neural network algorithm. Furthermore, the first neural network may comprise one, two or more non-linear activation functions, in particular a rectifier, and/or a normalization layer.

Preferably, one, two or more of the layers of the first artificial neural network is/are memoized layer(s). A memoized layer stores the results of that layer during the latest pass, i.e. during the latest execution of the neural network algorithm. The memoized layer allows for an implementation, wherein during every pass only the stored values of the memoized layer are updated that depend on a tensor element that is non-zero in the input sparse tensor. This technique significantly accelerates the neural network inference speed and in the present device can lead to better quality inference frames for the consecutive machine learning module.

The idea behind utilizing one or multiple memoized layers is that when only very little changes in the previous layer, it is sufficient to only update the internal values/states of the neural network that are affected. This can save processing power on updating the states in the neural network. Besides convolutional layers, also non-linear activation functions and/or normalization layers may be memoized. Advantageously, every convolutional layer and/or every non-linear activation functions may be of a memoized kind. In this case, in every layer, only the values are updated that are directly affected by a change in the input. The input may be both the sparse tensor and the last result of the neural network. Thus, only the values are updated that are directly affected by the sparse matrix input. These values are recomputed, for which all inputs are taken into account. While the memoization may be applied to any layer of any type of artificial neural network, here it is advantageously applied to the first neural network, which in particular may be an RNN.

In accordance with a preferred embodiment, the machine learning module comprises a second artificial neural network. In other words, the controller is configured to utilize said inference frame as input to a second artificial neural network and operate the second artificial neural network to obtain the output data. In particular, the second artificial neural network may be a back-propagation trained neural network such as a convolutional neural network. In alternative embodiments, a part of the second artificial neural network may be a convolutional neural network, in particular a common backend of it, as will be described further below.

Advantageously, the second artificial neural network is already trained, in particular using the "adam" or the "stochastic gradient descent (SGD)" optimizer, which are known methods for training neural networks. The training may have been performed using large quantities of annotated data that were recorded and hand annotated. Some select layers may be re-trained or fine-tuned by the user of the device. In this case, the user may have to perform a task such as looking at specific positions on a computer screen, e.g. for calibration purposes. The device then collects data from the sensor and fine-tunes the last layer(s), in particular the last trainable layer of the second artificial neural network, to better fit the user's individual characteristics and behavior. The first and second artificial neural networks can either be trained separately, or they can be trained simultaneously as one system. The second neural network, also when comprising a common backend and multiple frontends, may be trained as one neural network, preferably with different losses applied to different frontends.

Preferably, the convolutional neural network comprises a common backend and one or more frontends. While the common backend will perform the bulk analysis of the input, it will generate an output to then be analyzed by the frontend or frontends, which are specifically configured and/or trained for estimating specific attributes that are to be produced by the device. These attributes may include a gaze direction of the user, a pupil center position of the eye of the user, a pupil outline of the eye of the user, a pupil diameter of the eye of the user, an eye lid position of the eye of the user, a pupil shape of the eye of the user, a person identification information relating to the user, and/or a pupil movement prediction of the eye of said user.

These are important attributes that may be of interest for the eye-tracking device to acquire. Consequently, the controller is advantageously configured to extract one or multiple of these attributes from the output data information even if the machine learning method does not comprise a convolutional neural network with a common backend and one or more frontends. Advantageously, the backend is a fully convolutional encoder-decoder system. The mentioned person identification information may be useful if the device is used by multiple users, in which case the determined person identification information may help to identify which of the users is currently using the device.

According to an advantageous embodiment, the convolutional neural network or the part of the second neural network that is realized as a convolutional neural network, in particular the common backend part, is realized at least partly with an encoder-decoder scheme, comprising one or multiple encoder block(s) and one or multiple decoder block(s). Advantageously, the common backend may comprise two, four, or six encoder blocks and/or two, four, or six decoder blocks. Advantageously, the convolutional neural network or the common backend of it is a fully convolutional encoder-decoder system. Such an encoder-decoder neural network allows the implementation of feature learning or representation learning. Each of the encoder block(s) and/or decoder block(s) may in particular comprise at least two convolutional layers. The convolutional neural network further may comprise identity skip connections between said encoder block(s) and said decoder block(s). Such skip connections or shortcuts, also called residual connection, are utilized to skip one or multiple layers of the neural network, in order to allow training of deeper neural networks, helping with the vanishing gradient problem. Advantageously, a skip connection connects a first encoder with a last decoder and/or a second encoder with a second to last decoder of an encoder-decoder system etc.

The event sensor of the eye tracking device may be provided with optical filters in order for it to only detect radiation from a certain range of wavelengths, such as infrared (IR) radiation, in particular an infrared band-pass filter. While it is possible that the radiation reflecting off the eye is ambient light, such an approach has the disadvantage that it might produce parasitic signals due to possibly low radiation levels or light disturbances. Therefore, advantageously, a radiation source is provided, which is configured to send radiation to the eye of the user such that it is reflected off that eye and is received by the event sensor. In order for the radiation source to not disturb the user, the radiation it produces should be well outside of the visible regime. Preferably, the radiation source is an infrared (IR) emitter.

Advantageously, the eye tracking device comprises a body mountable apparatus, in particular a head-mountable apparatus, for mounting the eye tracking device to the body of said user, in particular to his or her head. The fields of application for such a device may include virtual reality or augmented reality, where it can support the implementation of foveated rendering.

According to a further aspect of the invention, an eye tracking method and a computer-readable medium are provided. Any features described above in connection with the eye tracking device may also be used alone or in suitable combinations in the eye tracking method or the computer-readable medium.

BRIEF DESCRIPTION OF THE DRAWINGS

Some examples of embodiments of the present invention will be explained in more detail in the following description with reference to the accompanying schematic drawings, wherein.

DETAILED DESCRIPTION

Figure 1:
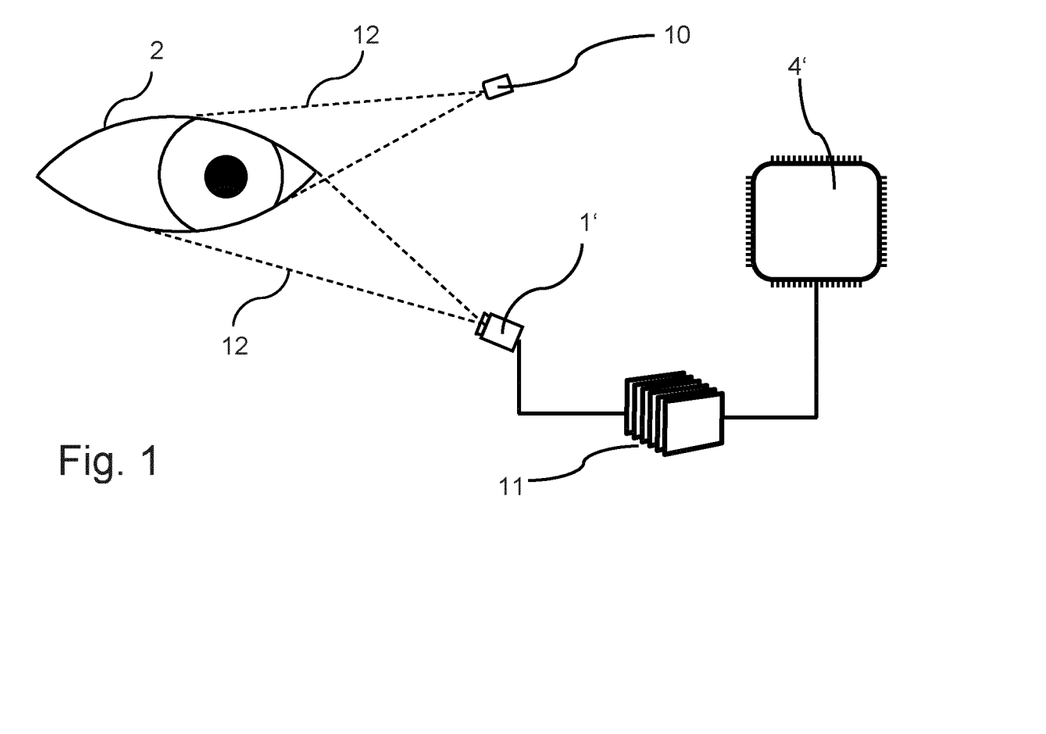
FIG. 1 shows a schematic diagram of the setup of an eye-tracking device according to the prior art.

FIG. 1 shows in a schematic diagram the setup of an eye-tracking device according to the prior art. A radiation source 10 sends out radiation 12 that is reflected off an eye 2 of a user, which is to be tracked. The reflected radiation 12 is incident on a conventional, i.e. frame-based camera 1'. The frame-based camera 1' detects the incident radiation 12 and generates a sequence 11 of video or image frames, which are transmitted to a conventional controller 4'. The controller 4' analyzes the video or image frames and can determine various parameters of the monitored eye 2, in particular a gaze direction.

Figure 2:
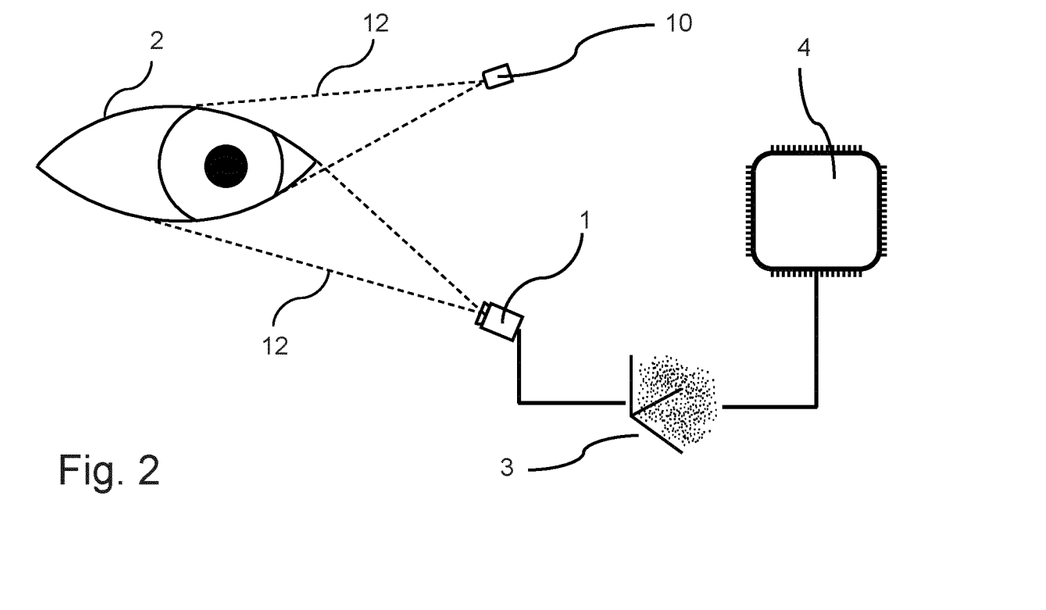
FIG. 2 shows a schematic diagram of the setup of an eye-tracking device according to one preferred embodiment.

A schematic diagram of the setup of an eye-tracking device according to a preferred embodiment of the present invention is shown in FIG. 2. Similar to the prior art case shown in FIG. 1, a radiation source 10 sends out radiation 12 that is reflected off an eye 2 of a user. The reflected radiation 12 is incident on an event-based sensor or event sensor 1. The radiation source 10, the event sensor 1, and an optical lens (not shown) for focusing the radiation are mounted onto a head-mountable device (not shown), such as glasses, virtual reality (VR) or augmented reality (AR) devices. The event sensor 1 is equipped with an infrared band-pass filter. Eye movements cause changes in the light intensity of the radiation 12 reflected off the user's eye 2. These light intensity changes or variations are picked up by the event sensor 1. In response, the event sensor 1 generates a stream 3 of light change events, which are transmitted to a controller 4 for processing. This processing includes, as will be described in the following, a preprocessing of the stream 3 of events to obtain suitable input for a recurrent neural network (RNN), performing the RNN on the preprocessed data to obtain an inference frame and performing a convolutional neural network (CNN) for estimating desired attributes.

Figure 3A:
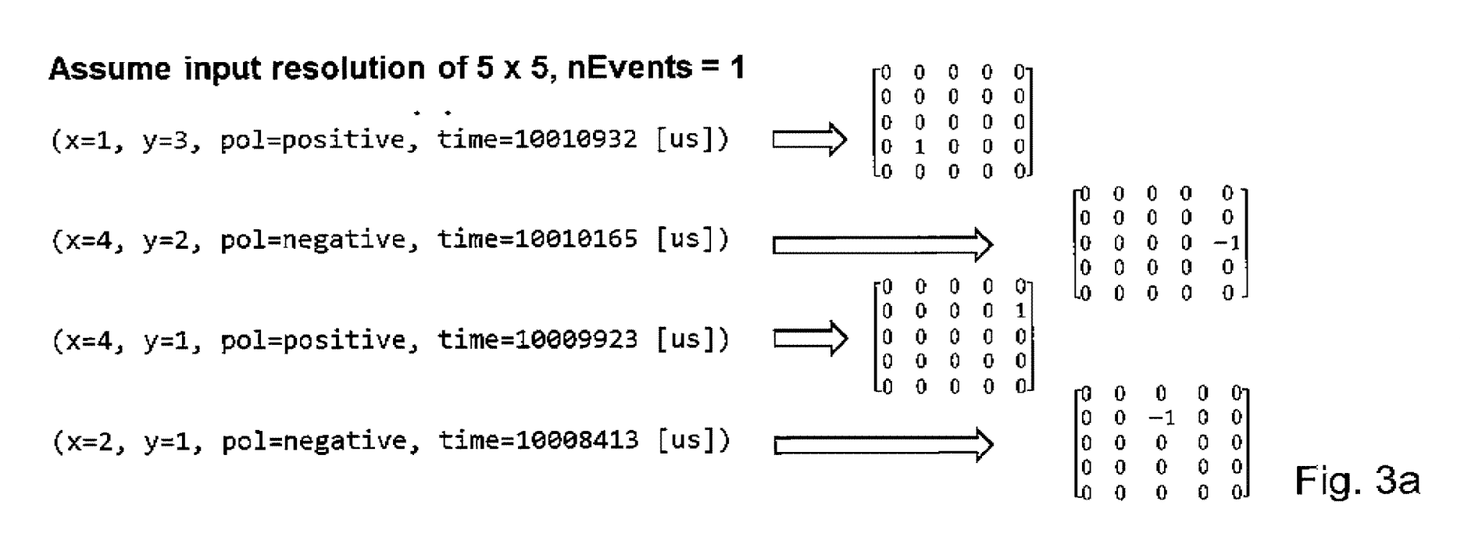
FIGS. 3a and 3b show the preparation of a sparse tensor, each on the basis of one (FIG. 3a) and two (FIG. 3b) events.
Figure 3B:
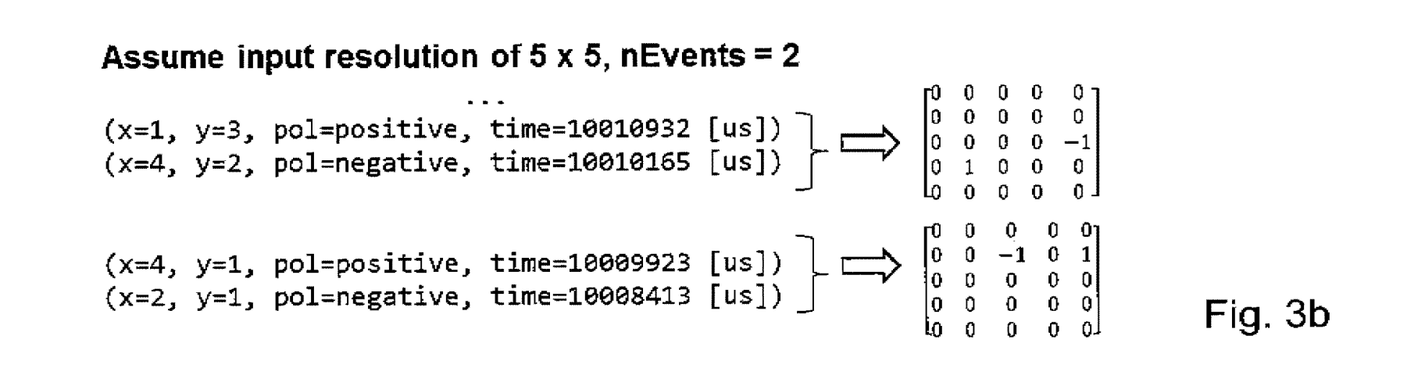

An event is a 4-tuple defined as (p,x,y,t), with p either being the polarity of the light change (positive meaning the light intensity increased, negative meaning the light intensity decreased) or the signed change magnitude in linear, logarithmic or other scaling of light intensity change. x and y are the pixel coordinates of the event and t is the exact timestamp of the observed event. Such events are shown in FIGS. 3a and 3b. FIGS. 3a and 3b visualize a preprocessing step performed by the controller 4 upon receipt of the events. One or multiple events, shown left to the arrows, are accumulated and transformed to a sparse tensor or sparse matrix, shown right to the arrows. FIG. 3a shows single events being each transformed into a sparse tensor. The sparse tensor is filled with zeros except in the (x, y) position corresponding to the (x, y) coordinates of the corresponding event, which contains the value p. In contrast, FIG. 3b shows events being transformed to a sparse tensor in pairs.

There may be more events being assembled to one sparse tensor. Furthermore, as an alternative to basing each sparse tensor on a predetermined number of events, it can be based on events falling within a predetermined time interval or time duration.

Figure 4:
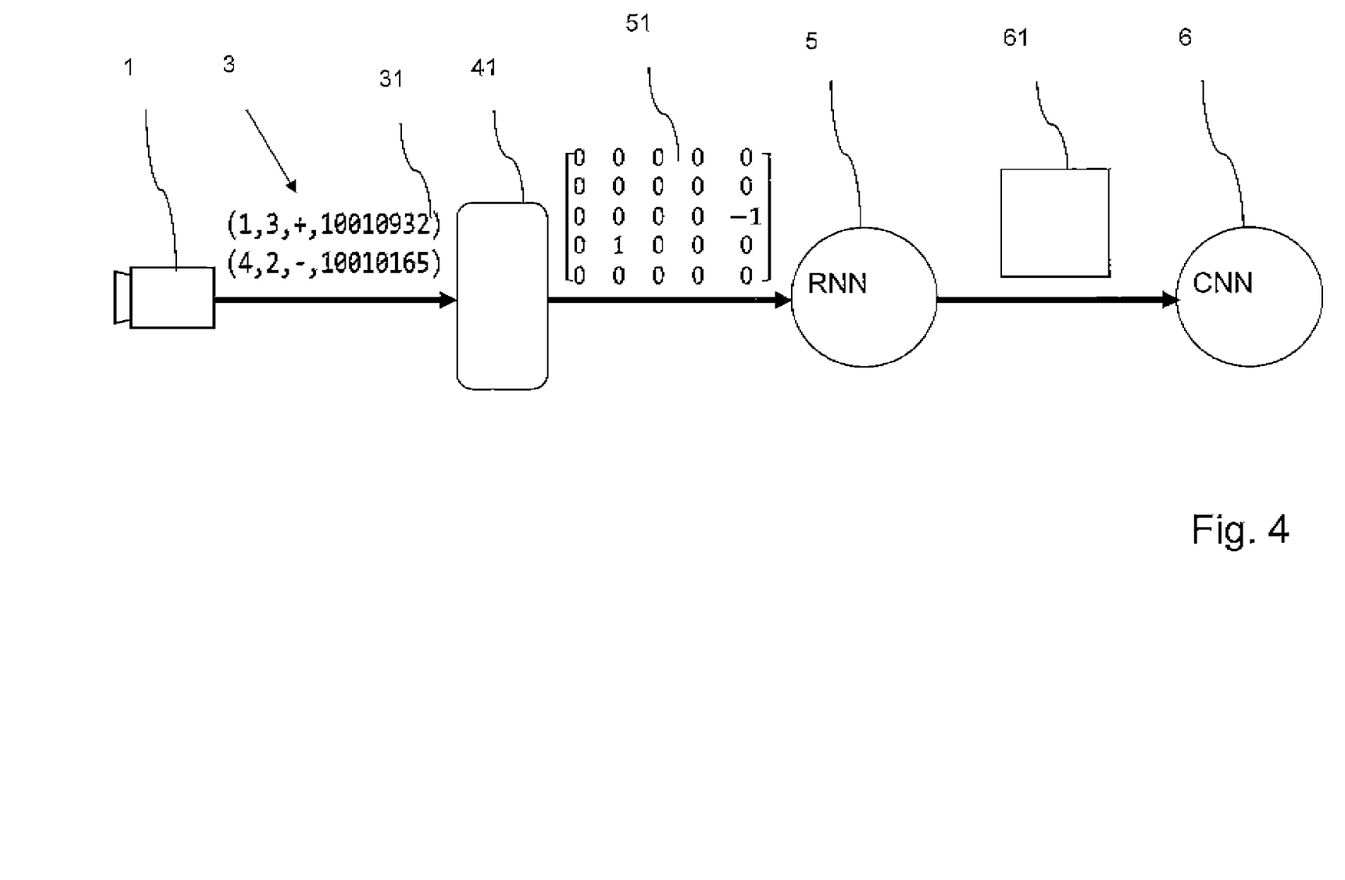
FIG. 4 shows a signal flow diagram showing the different processing stages of an eye tracking device according to a preferred embodiment.

The different processing stages of the eye tracking device and the types of data transferred between these stages are shown in FIG. 4. The event sensor 1 generates a stream 3 of events 31. These events 31 are transferred to the controller 4, and are processed by a preprocessing module 41 to obtain sparse tensors 51 as described above with reference to FIG. 3a/3b. The tensor 51 is used as input for the first neural network, which here is a recurrent neural network (RNN) 5, to generate an inference frame 61. Finally, the inference frame 61 is fed into a convolutional neural network (CNN) 6, which performs the estimation of pupil parameters, in particular of the gaze direction.

Figure 5:
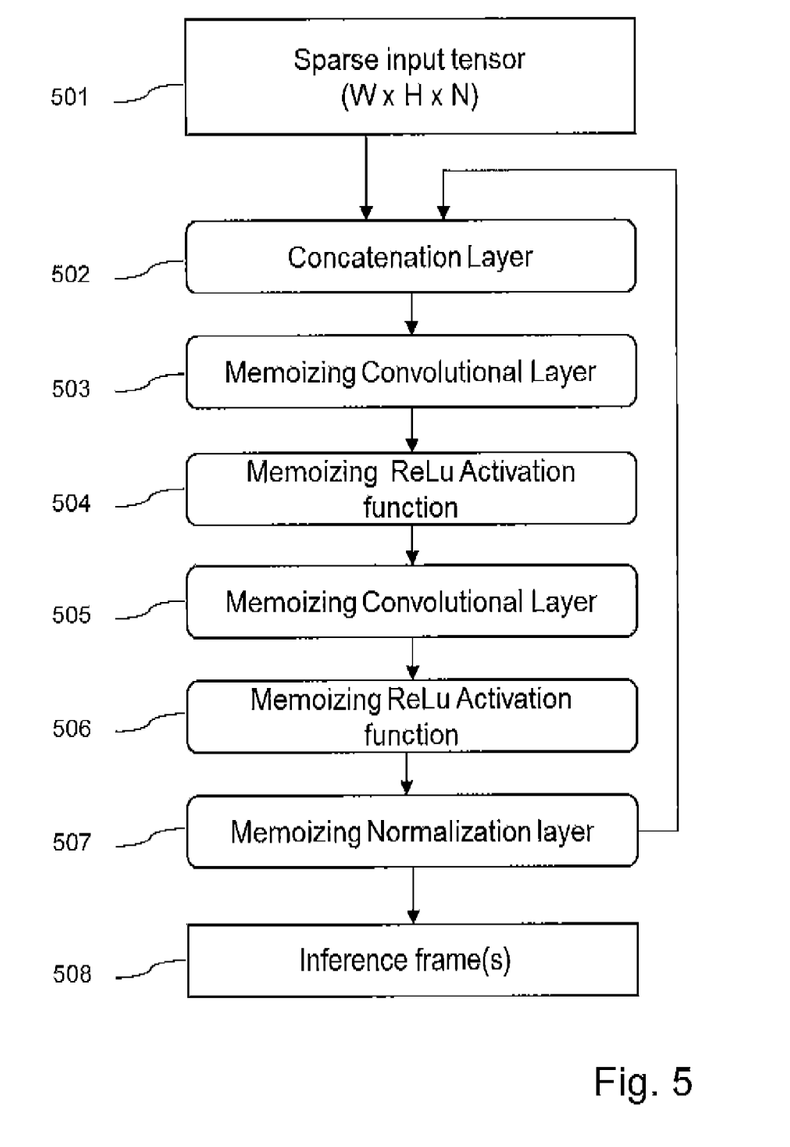
FIG. 5 shows the layer structure of a first artificial neural network according to a preferred embodiment.
Figure 6:
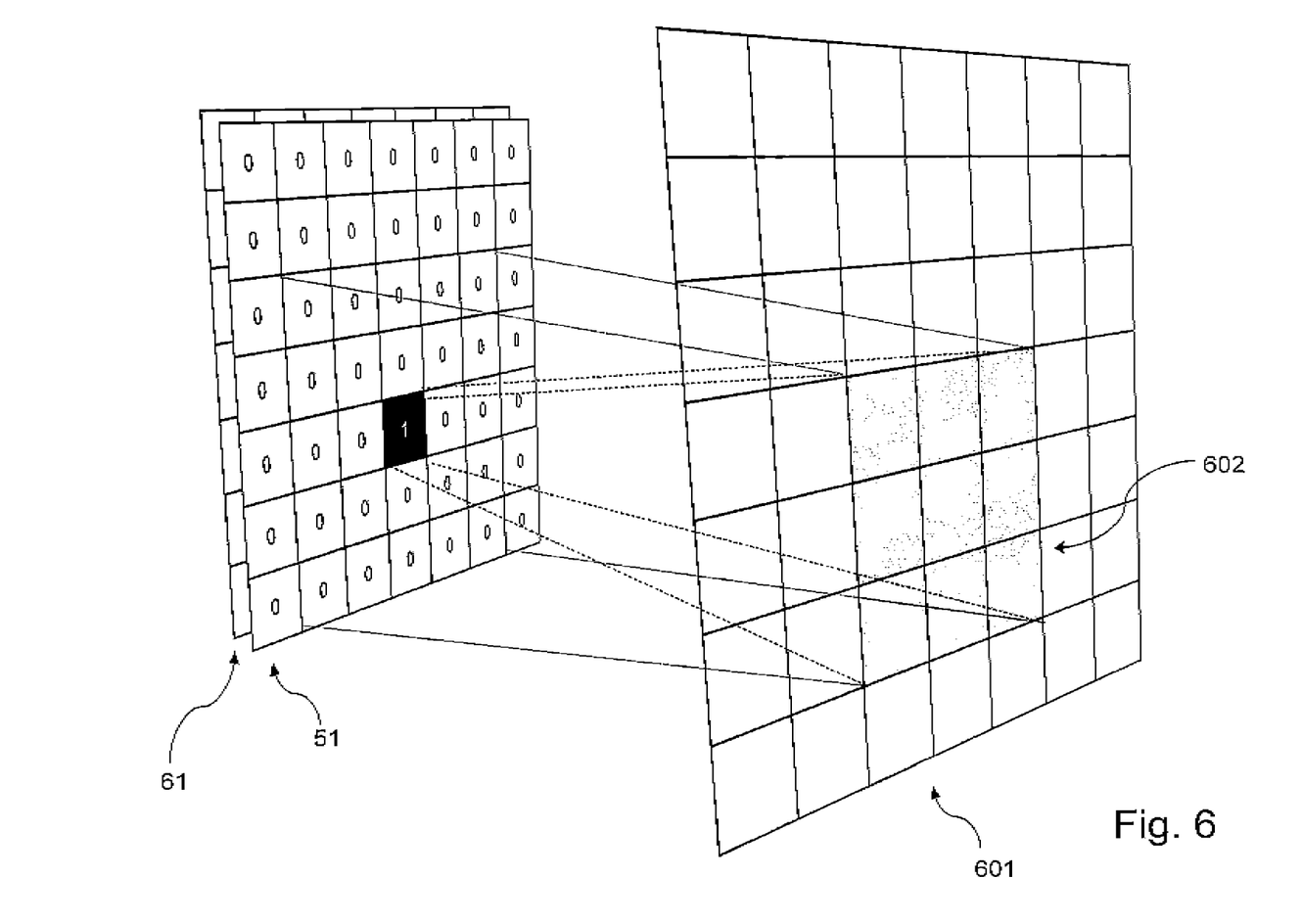
FIG. 6 shows a schematic for clarifying a sparse update scheme in a convolutional layer of the neural network described in FIG. 5.

FIG. 5 outlines a possible setup of an RNN based algorithm. The RNN algorithm is triggered based on the availability of data. Therefore, each time a new sparse tensor is generated, the RNN algorithm is invoked to generate a new inference frame. As a first step, the sparse tensors obtained from the DVS event stream is input 501 into the RNN. The RNN keeps an internal state of the last inference frame generated, as well as potentially other intermediate activation maps. The RNN network estimates a new state based on the last state and the sparse input tensor. To achieve high performance, the sparse nature of the input tensor is utilized, to only update the values in deeper layers that are affected changes in the input tensor or input matrix. FIG. 6 illustrates this sparse update regime, which will be explained further below.

A concatenation layer 502 joins or concatenates in channel dimension the sparse input tensor and the inference frame generated during the previous processing of the RNN. Then a first convolutional layer 503 performs a convolution on this concatenation. A second convolution layer 505 then works on the output of the first convolution layer 503. The output of the first convolution layer 503 is then normalized (batch normalization) 507. The RNN further comprises two non-linear activation functions 504, 506. Through this layer structure, the inference frame is generated 508, which is used as one of the inputs for the concatenation layer 502.

Each of the layers 503, 504, 505, 506, 507 of the RNN are memoized. A "memoized" layer stores the results of the latest pass. In the present embodiment, in every pass, only the values in the RNN are updated that depend on a tensor element that is non-zero in the sparse input tensor. This technique allows to significantly accelerate the RNN inference speed and to take advantage of better quality inference frames for consecutive the CNN estimator. FIG. 6 illustrates this approach with a 3×3 convolutional kernel. The previous inference frame 61 and the sparse input tensor 51, or short sparse tensor 51, are concatenated, as illustrated on the left. On the right is shown that only a subset 602 of activations in the convolutional layer is updated due to the sparse nature of the input tensor 51.

Figure 7:
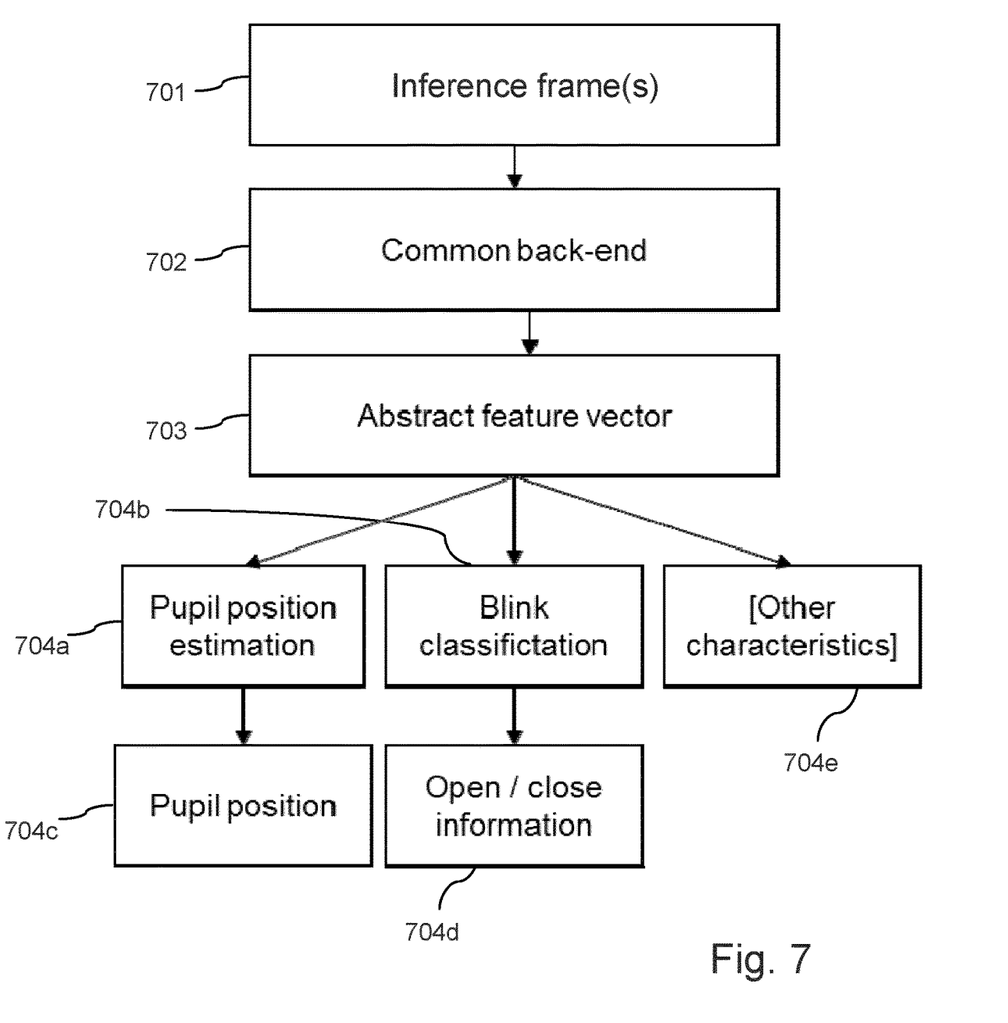
FIG. 7 shows the basic structure of a second artificial neural network according to a preferred embodiment.

FIG. 7 shows a conceptual outline of the architecture of CNN, which receives the inference frame 701 from the RNN. The CNN has a common backend 702, which generates an abstract feature vector 703 or abstract feature map.

This feature vector is used as input for various frontend modules 704 following the common backend 702. The exemplary frontends shown in FIG. 7 include a pupil position estimation module 704a, which outputs a pupil position 704c as a result, and a blink classification module 704b, which outputs information on whether the eye is open or closed 704d. Other modules 704e of the frontend 703 may be provided that are dedicated to other attributes to be determined.

Figure 8:
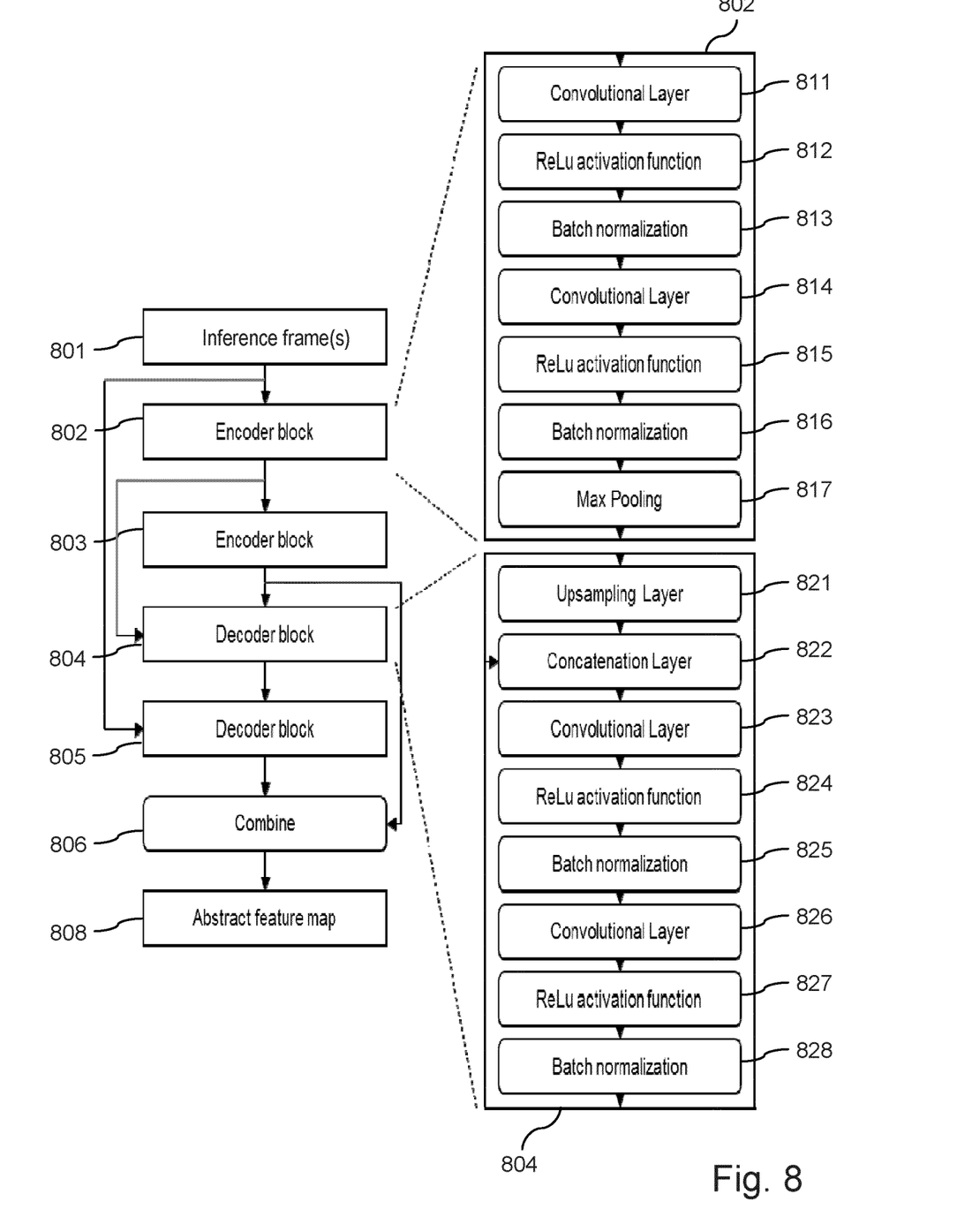
FIG. 8 shows the layer structure of a backend section of the second artificial neural network shown in FIG. 7.
Figure 9:
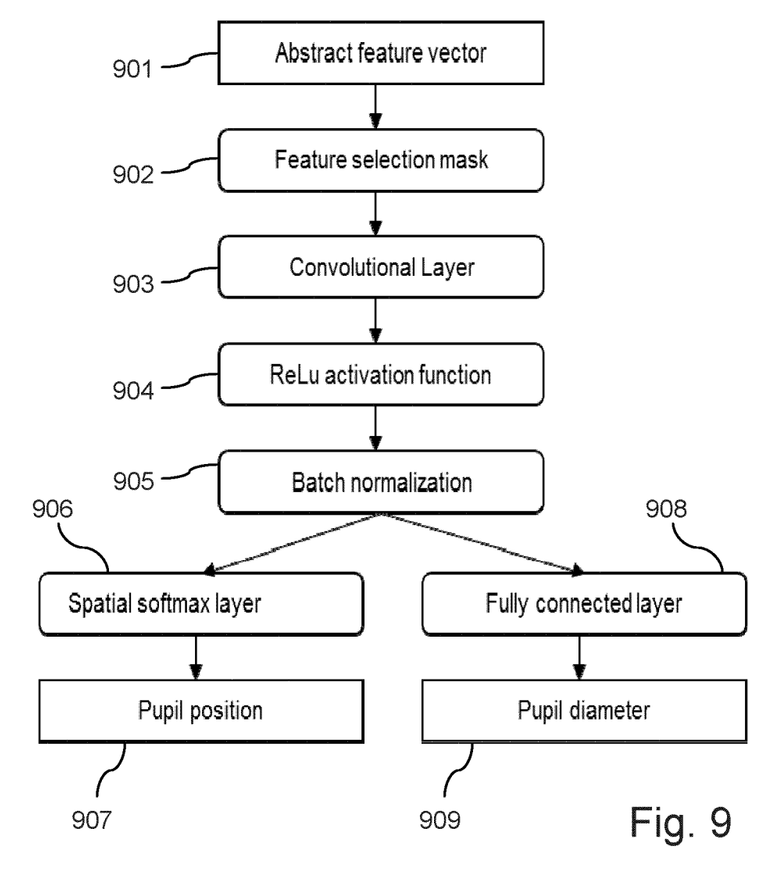
FIG. 9 shows the layer structure of a frontend section of the second artificial neural network shown in FIG. 7.
Figure 10:
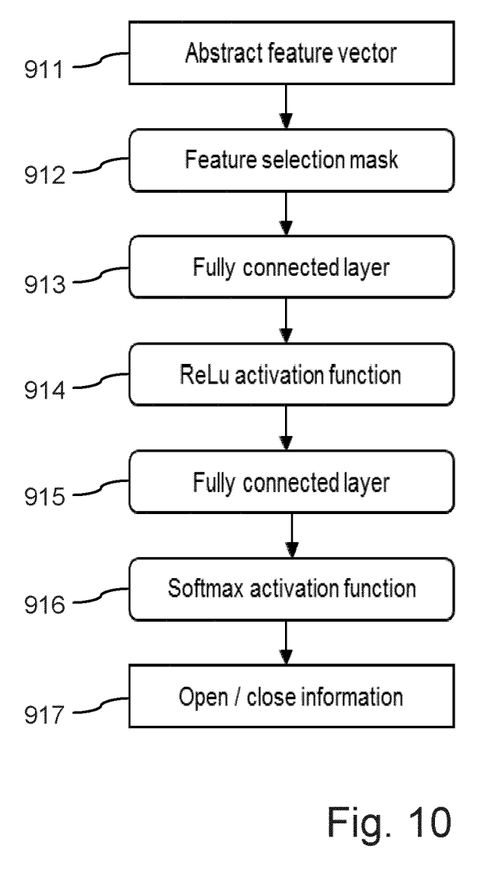
FIG. 10 shows the layer structure of a further frontend section of the second artificial neural network shown in FIG. 7.

While FIG. 8 shows a potential implementation of the backend in more detail, potential implementations of the two frontends shown in FIG. 7 are presented in more detail in FIGS. 9 and 10.

The common backend shown in FIG. 8 on the left is based on an encoder-decoder scheme and comprises two encoder blocks 802, 803 and two decoder blocks 804, 805, which follow the encoder blocks. At the end of the backend, there is a combining layer 806, which produces the result of an abstract feature map 808 to be further processed by the frontend(s). As can be seen from the arrow leading from the second encoder block 803 to the combining layer 806, the abstract feature map 808 comprises information from the output of the second encoder block 803 and the second/last decoder block 805. In addition, as can be seen by the two arrows on the left side, there are two identity skip connections between the encoder and decoder stages. These skip connections lead from the first encoder block 802 to the second decoder block 805 and from the second encoder block 803 to the first decoder block 804.

On the right side of FIG. 8, both the encoder blocks 802 and the decoder blocks 804 are shown in more detail. All two encoder blocks 802, 803 may in particular have the same or very similar architecture. This may also apply to the two decoder blocks 804, 805. The encoder block 802 comprises two convolutional layers 811, 814, two non-linear activation functions 812, 815, batch-normalization 813, 816, as well as max-pooling 817. The decoder block 804 comprises an upsampling layer 821, a concatenation layer 822, two convolutional layers 823, 826, two non-linear activation functions 824, 827, and batch-normalization 825, 828. As mentioned further above, the common backend may comprise a different number of encoder and/or decoder blocks from the system shown here, while having the same architecture encoder and/or decoder blocks. For example, there might be provided two, four or six encoder blocks and/or two, four or six decoder blocks.

The two exemplary frontends indicated FIG. 7 are shown in more detail in FIGS. 9 and 10. The frontend in FIG. 9 is the one for pupil localization or pupil position estimation. It receives the feature vector 901 from the backend and applies a feature selection mask 902. After that follow a convolutional layer 903, a non-linear activation function 904 and a batch normalization 905. The result after batch normalization 905 is sent to a spatial softmax layer 906 for estimating a pupil position 907 and to a fully connected layer 908 for estimating a pupil diameter 909. The frontend in FIG. 10 is the one for blink detection. It receives the feature vector 911 from the backend and applies a different feature selection mask 912. This frontend comprises a first fully connected layer 913, a non-linear activation layer 914, a second fully connected layer 915, and softmax activation function 916, to provide information on whether the eye is open or close 917.

The entire CNN, with the backend and the frontend, is trained as one neural network, with different losses applied to different frontends. Other training schemes are possible, such as first training the CNN only with one frontend attached, then freezing one or more layers, and then training the CNN with one, or more frontends, possibly all frontends attached. Also possible is a scheme where the training between the different frontends is alternated. Unlike the RNN network for the inference frame generation, the CNN is much more complex and requires more processing power to generate a result. This is why the CNN is preferably not triggered by the availability of data, but instead by an applications need for a new prediction.

REFERENCE NUMERALS

1' frame-based camera, conventional camera
11 sequence of video frames
10 radiation source, IR emitter
1 event-based optical sensor, event sensor, DVS sensor
12 radiation incident on and reflected off the eye
2 eye of a user
3 signal stream of events
31 event
4' prior art controller
4 controller
41 input processing module
5 first artificial neural network, recurrent neural network, RNN
51 sparse tensor
6 machine learning module, second artificial neural network, convolutional neural network, CNN
61 inference frame

The invention claimed is:

1. An eye tracking device comprising:
an event-based optical sensor, which is configured to;
receive radiation reflected off an eye of a user and produce a signal stream of events, each event corresponding to detection of a temporal change in the received radiation at one or more pixels of said optical sensor; and
a controller, which is connected to said optical sensor and configured to:
a) receive the signal stream of events from said optical sensor,
b) convert a portion of said signal stream of events into a sparse tensor,
c) use said sparse tensor as an input for a first artificial neural network which is a recurrent neural network (RNN) having at least one memoized layer,
d) generate an inference frame utilizing said first artificial neural network based on at least said portion of said signal stream of events,
e) utilize said inference frame as input to a machine learning module and operate said machine learning module to obtain output data, and
f) extract from said output data information related to said eye of said user,
wherein only the values in the RNN that depend on a tensor element that is non-zero in said sparse tensor are updated.

2. The eye tracking device according to claim 1, wherein said controller is configured to convert said portion of said stream of events into a sparse tensor, and use said sparse tensor as an input for said first artificial neural network.

3. The eye tracking device according to claim 2, wherein said controller is configured to generate the sparse tensor based on a predetermined number of events or based on events occurring within a predetermined time interval or duration.

4. The eye tracking device according to claim 1, wherein said controller is configured to extract from said output data information a gaze direction of said user, a pupil center position of said eye of said user, a pupil outline of said eye of said user, a pupil diameter of said eye of said user, an eye lid position of said eye of said user, a pupil shape of said eye of said user, a person identification information relating to said user, and/or a pupil movement prediction of said eye of said user.

5. The eye tracking device according to claim 1, wherein said controller is configured to utilize said inference frame as input to a second artificial neural network and operate said second artificial neural network to obtain said output data.

6. The eye tracking device according to claim 5, wherein said controller is configured such that said second artificial neural network comprises a common backend and one or more frontends.

7. The eye tracking device according to claim 5, wherein said second artificial neural network is a convolutional neural network.

8. The eye tracking device according to claim 7, wherein said controller is configured such that said convolutional neural network is realized at least partly with an encoder-decoder scheme, comprising one or multiple encoder block(s) and one or multiple decoder block(s).

9. The eye tracking device according to claim 8, wherein said controller is configured such that said convolutional neural network comprises identity skip connections between said encoder block(s) and said decoder block(s).

10. The eye tracking device according to claim 8, said controller is configured such that each of said encoder block(s) and/or said decoder block(s) comprises at least two convolutional layers.

11. The eye tracking device according to claim 1, wherein a radiation source configured to send radiation to the eye of the user such that it is reflected off said eye of the user and is received by said event-based optical sensor.

12. An eye tracking method, comprising the following steps:
receiving a signal stream of events produced by an event-based optical sensor due to radiation reflected off an eye of a user being received by said event-based optical sensor, each event corresponding to detection of a temporal change in the received radiation at one or more pixels of said optical sensor;
converting a portion of said signal stream of events into a sparse tensor;
using said sparse tensor as an input for a first artificial neural network which is a recurrent neural network (RNN) having at least one memoized layer;
generating an inference frame utilizing said first artificial neural network based on at least said portion of said signal stream of events;
utilizing said inference frame as input to a machine learning module and operating said machine learning module to obtain output data; and
extracting from said output data information related to said eye of said user;
wherein only the values in the RNN that depend on a tensor element that is non-zero in said sparse tensor are updated.

13. A non-transitory computer-readable medium comprising instructions which, when executed by a computer or microcontroller, cause the computer or microcontroller to carry out the following steps:
receiving a signal stream of events produced by an event-based optical sensor due to radiation reflected off an eye of a user being received by said event-based optical sensor, each event corresponding to detection of a temporal change in the received radiation at one or more pixels of said optical sensor;
converting a portion of said signal stream of events into a sparse tensor;
using said sparse tensor as an input for a first artificial neural network which is a recurrent neural network (RNN) having at least one memoized layer;
generating an inference frame utilizing said first artificial neural network based on at least said portion of said signal stream of events;
utilizing said inference frame as input to a machine learning module and operating said machine learning module to obtain output data; and
extracting from said output data information related to said eye of said user,
wherein only the values in the RNN that depend on a tensor element that is non-zero in said sparse tensor are updated.

* * * * *